US008843387B2

(12) United States Patent
Ricketts (10) Patent No.: US 8,843,387 B2
(45) Date of Patent: Sep. 23, 2014

(54) MANAGING BUSINESS PROCESS CALENDARS

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 11/835,824

(22) Filed: Aug. 8, 2007

(65) Prior Publication Data

US 2009/0043632 A1 Feb. 12, 2009

(51) Int. Cl.
G06Q 10/00 (2012.01)
G06Q 10/10 (2012.01)
G06Q 10/06 (2012.01)

(52) U.S. Cl.
CPC ........ G06Q 10/109 (2013.01); G06Q 10/06314 (2013.01); G06Q 10/1097 (2013.01)
USPC .......................... 705/7.12; 705/7.13; 705/7.16

(58) Field of Classification Search
USPC ....................................... 705/7.13, 7.12, 7.16
See application file for complete search history.

(56) References Cited

U.S. PATENT DOCUMENTS

| | | | |
|---|---|---|---|
| 5,734,837 A * | 3/1998 | Flores et al. ................. | 705/7.13 |
| 5,845,257 A * | 12/1998 | Fu et al. .......................... | 705/8 |
| 6,785,680 B1 * | 8/2004 | Cragun .......................... | 719/318 |
| 2005/0216111 A1 * | 9/2005 | Ooshima et al. ............... | 700/99 |
| 2006/0004618 A1 * | 1/2006 | Brixius ............................ | 705/8 |
| 2006/0085245 A1 * | 4/2006 | Takatsuka et al. ............... | 705/9 |
| 2006/0184406 A1 * | 8/2006 | Scott et al. ....................... | 705/7 |
| 2008/0140488 A1 * | 6/2008 | Oral et al. ........................ | 705/8 |
| 2009/0024239 A1 * | 1/2009 | Yoshioka et al. ............. | 700/110 |

OTHER PUBLICATIONS

"Outlook Calendar." The University of Alabama HelpDesk, Feb. 6, 2007. Web. <http://web.archive.org/web/20070206124857/http://helpdesk.ua.edu/training/outlook/calendar.html>.*

* cited by examiner

Primary Examiner — Beth V. Boswell
Assistant Examiner — William Brockington, III
(74) Attorney, Agent, or Firm — Matthew Chung; Roberts Mlotkowski Safran & Cole, P.C.

(57) ABSTRACT

A system and method of managing business process calendars. A method of managing a process includes defining at least one process to be performed by a first entity for at least one second entity, and associating a first subset of a plurality of tasks of the at least one process with the first entity. The method further includes associating a second subset of the plurality of tasks with the at least one second entity, and creating a process calendar based upon the at least one process and the plurality of tasks. The method additionally includes displaying the process calendar.

13 Claims, 11 Drawing Sheets

|  | CLIENT |  |  | PROVIDER |  | Timeline | Task #1 | Task #2 | Task #3 |
|---|---|---|---|---|---|---|---|---|---|
| Mon | 8 AM | WORKING | Mon | 8 PM | IDLE | 1 | C | | |
| Mon | 9 AM | WORKING | Mon | 9 PM | IDLE | 2 | C | | |
| Mon | 10 AM | WORKING | Mon | 10 PM | IDLE | 3 | C | | |
| Mon | 11 AM | WORKING | Mon | 11 PM | IDLE | 4 | C | | |
| Mon | 12 PM | WORKING | Tue | 12 AM | IDLE | 5 | C | | |
| Mon | 1 PM | WORKING | Tue | 1 AM | IDLE | 6 | | | |
| Mon | 2 PM | WORKING | Tue | 2 AM | IDLE | 7 | | | |
| Mon | 3 PM | WORKING | Tue | 3 AM | IDLE | 8 | | | |
| Mon | 8 PM | IDLE | Tue | 8 AM | WORKING | 13 | | 2*P | |
| Mon | 9 PM | IDLE | Tue | 9 AM | WORKING | 14 | | P | |
| Mon | 10 PM | IDLE | Tue | 10 AM | WORKING | 15 | | P | |
| Mon | 11 PM | IDLE | Tue | 11 AM | WORKING | 16 | | P | |
| Tue | 12 AM | IDLE | Tue | 12 PM | WORKING | 17 | | P | |
| Tue | 1 AM | IDLE | Tue | 1 PM | WORKING | 18 | | P | |
| Tue | 2 AM | IDLE | Tue | 2 PM | WORKING | 19 | | P | |
| Tue | 3 AM | IDLE | Tue | 3 PM | WORKING | 20 | | P | |
| Tue | 8 AM | WORKING | Tue | 8 PM | IDLE | 25 | | | C |
| Tue | 9 AM | WORKING | Tue | 9 PM | IDLE | 26 | | | C |
| Tue | 10 AM | WORKING | Tue | 10 PM | IDLE | 27 | | | C |
| Tue | 11 AM | WORKING | Tue | 11 PM | IDLE | 28 | | | C |
| Tue | 12 PM | WORKING | Wed | 12 AM | IDLE | 29 | | | C |
| Tue | 1 PM | WORKING | Wed | 1 AM | IDLE | 30 | | | C |
| Tue | 2 PM | WORKING | Wed | 2 AM | IDLE | 31 | | | |
| Tue | 3 PM | WORKING | Wed | 3 AM | IDLE | 32 | | | |
| Tue | 8 PM | IDLE | Wed | 8 AM | WORKING | 37 | | | |
| Tue | 9 PM | IDLE | Wed | 9 AM | WORKING | 38 | | | |
| Tue | 10 PM | IDLE | Wed | 10 AM | WORKING | 39 | | | |
| Tue | 11 PM | IDLE | Wed | 11 AM | WORKING | 40 | | | |
| Wed | 12 AM | IDLE | Wed | 12 PM | WORKING | 41 | | | |
| Wed | 1 AM | IDLE | Wed | 1 PM | WORKING | 42 | | | |
| Wed | 2 AM | IDLE | Wed | 2 PM | WORKING | 43 | | | |
| Wed | 3 AM | IDLE | Wed | 3 PM | WORKING | 44 | | | |
| Wed | 8 AM | WORKING | Wed | 8 PM | IDLE | 49 | | | |
| Wed | 9 AM | WORKING | Wed | 9 PM | IDLE | 50 | | | |
| Wed | 10 AM | WORKING | Wed | 10 PM | IDLE | 51 | | | |
| Wed | 11 AM | WORKING | Wed | 11 PM | IDLE | 52 | | | |
| Wed | 12 PM | WORKING | Thu | 12 AM | IDLE | 53 | | | |
| Wed | 1 PM | WORKING | Thu | 1 AM | IDLE | 54 | | | |
| Wed | 2 PM | WORKING | Thu | 2 AM | IDLE | 55 | | | |
| Wed | 3 PM | WORKING | Thu | 3 AM | IDLE | 56 | | | |

| | CLIENT | | | PROVIDER | | Timeline | Task #1 | Task #2 | Task #3 |
|---|---|---|---|---|---|---|---|---|---|
| Mon | 8 AM | WORKING | Mon | 12 PM | WORKING | 1 | C | | |
| Mon | 9 AM | WORKING | Mon | 1 PM | WORKING | 2 | C | | |
| Mon | 10 AM | WORKING | Mon | 2 PM | WORKING | 3 | C | | |
| Mon | 11 AM | WORKING | Mon | 3 PM | WORKING | 4 | C | | |
| Mon | 12 PM | WORKING | Tue | 4 PM | IDLE | 5 | C | | |
| Mon | 1 PM | WORKING | Tue | 5 PM | IDLE | 6 | | | |
| Mon | 2 PM | WORKING | Tue | 6 PM | IDLE | 7 | | | |
| Mon | 3 PM | WORKING | Tue | 7 PM | IDLE | 8 | | | |
| Tue | 4 AM | IDLE | Tue | 8 AM | WORKING | 21 | | 2*P | |
| Tue | 5 AM | IDLE | Tue | 9 AM | WORKING | 22 | | P | |
| Tue | 6 AM | IDLE | Tue | 10 AM | WORKING | 23 | | P | |
| Tue | 7 AM | IDLE | Tue | 11 AM | WORKING | 24 | | P | |
| Tue | 8 AM | WORKING | Tue | 12 PM | WORKING | 25 | | P | |
| Tue | 9 AM | WORKING | Tue | 1 PM | WORKING | 26 | | P | |
| Tue | 10 AM | WORKING | Tue | 2 PM | WORKING | 27 | | P | |
| Tue | 11 AM | WORKING | Tue | 3 PM | WORKING | 28 | | P | |
| Tue | 12 PM | WORKING | Wed | 4 PM | IDLE | 29 | | | C |
| Tue | 1 PM | WORKING | Wed | 5 PM | IDLE | 30 | | | C |
| Tue | 2 PM | WORKING | Wed | 6 PM | IDLE | 31 | | | C |
| Tue | 3 PM | WORKING | Wed | 7 PM | IDLE | 32 | | | C |
| Wed | 4 AM | IDLE | Wed | 8 AM | WORKING | 45 | | | |
| Wed | 5 AM | IDLE | Wed | 9 AM | WORKING | 46 | | | |
| Wed | 6 AM | IDLE | Wed | 10 AM | WORKING | 47 | | | |
| Wed | 7 AM | IDLE | Wed | 11 AM | WORKING | 48 | | | |
| Wed | 8 AM | WORKING | Wed | 12 PM | WORKING | 49 | | | C |
| Wed | 9 AM | WORKING | Wed | 1 PM | WORKING | 50 | | | C |
| Wed | 10 AM | WORKING | Wed | 2 PM | WORKING | 51 | | | |
| Wed | 11 AM | WORKING | Wed | 3 PM | WORKING | 52 | | | |
| Wed | 12 PM | WORKING | Thu | 4 PM | IDLE | 53 | | | |
| Wed | 1 PM | WORKING | Thu | 5 PM | IDLE | 54 | | | |
| Wed | 2 PM | WORKING | Thu | 6 PM | IDLE | 55 | | | |
| Wed | 3 PM | WORKING | Thu | 7 PM | IDLE | 56 | | | |

MANAGING BUSINESS PROCESS CALENDARS

FIELD OF THE INVENTION

The invention generally relates to managing process calendars and, more particularly, to creating, displaying, modifying, and utilizing process calendars.

BACKGROUND OF THE INVENTION

A business process typically comprises a set of tasks associated with executing an operation of a business. Such processes can be performed concurrently and continuously (e.g., making sales and collecting payments), or in sequence on a frequently recurring schedule (e.g., preparing paychecks).

A process calendar is commonly thought of as the schedule for a business process, and may present a timeline for the tasks involved in a process. The process calendar may be subject to constraints, such as, for example: due date of tasks (e.g., a specific date around which the tasks are scheduled); precedence of tasks (e.g., the relationship between tasks that specifies which tasks must be completed before or concurrent with other tasks); duration of tasks (e.g., the amount of time required to complete a task, which can be fixed or variable); volume (e.g., when inputs drive processing time, there is an upper threshold that cannot be exceeded and a lower threshold that should not be exceeded); elasticity (e.g., task duration that depends on the duration of other tasks (for example, management and quality assurance tasks may expand or contract based on other tasks)); time off (e.g., holidays and shutdown periods which decrease capacity); time on (e.g., overtime or part-time work which increase capacity); contention (e.g., there are not enough workers available to complete concurrent tasks); and shifts (e.g., the working hours schedulable for each task).

It is common for business processes to be outsourced. For example, a client may outsource its payroll process to a service provider, such that the service provider performs at least some of the tasks involved in the process. In such a situation, it is possible that both the client and provider may have tasks to perform in completing the payroll process. As a simplified example, the client may be responsible for reporting the time worked by each employee to the service provider, and the service provider may be responsible for timely payment of each employee.

Prior to outsourcing to a service provider, the client may have performed the business process on its own. For example, a company may have done its own payroll process for a time period before deciding to outsource the payroll process to a service provider. However, when transitioning to an outsourced process, there are usually differences between how the client performed the process and how the provider performs the process. That is, the client's custom process and the service provider's standard process may have significant differences due to technology, skills, best practices, etc. Furthermore, the client may engage third parties for some of its tasks, while the service provider may use subcontractors for some of its tasks.

Differences between the client's custom process and the service provider's standard process can lead to increased cost and complexity in performing the process. For example, the respective processes may differ in tasks, duration, timing, and staffing. More specifically, the client and service provider may use staff in different salary bands because their skill levels differ. For it to make sense for a client to outsource a process, the service provider's process needs to be less expensive and/or simpler than the client's current process, or produce better results. As the difference between possible options narrows, so does any perceived advantage to the client. Moreover, processes may also differ in anticipated service levels. If the client expects the service provider to attain higher service levels, the process may have to be altered.

Furthermore, when a client, service provider, third-party, and/or subcontractor have different constraints, the process manager may attempt to reconcile those differences in order to produce a feasible process calendar. For example, when parties are in different time zones and their shifts are not concurrent, time-zone differences are a constraint. Similarly, when parties have concurrent shifts but different holidays, time-off differences are a constraint.

Although the scheduling of tasks in a business process is similar to how tasks are scheduled in a project, business processes and projects are fundamentally different in several ways. For example, each project is unique in some way, but business processes are usually recurring. That is, a given task is normally scheduled just once per project, but perhaps multiple times per process (at least once per cycle). Also, projects are frequently late, while processes generally must be completed on time. That is, scope creep and change orders tend to make projects late, but service level agreements generally require service providers to complete process cycles on time or pay penalties, even when input volumes vary. Additionally, resources are typically assigned only for the duration of projects, but indefinitely to processes. The recurring nature of tasks in processes means each resource likely performs the same task over and over. Moreover, project schedules rarely, if ever, consider time zone differences, while processes often do.

Accordingly, there exists a need in the art to overcome the deficiencies and limitations described hereinabove.

SUMMARY OF THE INVENTION

In a first aspect of the invention, there is a method of managing a process, comprising defining at least one process to be performed by a first entity for at least one second entity, and associating a first subset of a plurality of tasks of the at least one process with the first entity. The method further includes associating a second subset of the plurality of tasks with the at least one second entity, and creating a process calendar based upon the at least one process and the plurality of tasks. The method additionally includes displaying the process calendar.

In another aspect of the invention, there is a method for managing a process, comprising providing a computer infrastructure being operable to: define at least one process to be performed by a first entity for at least one second entity. The computer infrastructure is further operable to associate a first subset of a plurality of tasks of the at least one process with the first entity, and associate a second subset of the plurality of tasks with the at least one second entity. The computer infrastructure is also operable to create a process calendar based upon the at least one process and the plurality of tasks, and display the process calendar.

In another aspect of the invention, there is a computer program product comprising a computer usable medium having a computer readable program embodied in the medium, wherein the computer readable program when executed on a computing device is operable to cause the computing device to define at least one process to be performed by a first entity for at least one second entity. The computer readable program is operable to cause the computing device to associate a first subset of a plurality of tasks of the at least one process with the first entity, and associate a second subset of the plurality of tasks with the at least one second entity. The computer readable program is operable to cause the computing device to create a process calendar based upon the at least one process and the plurality of tasks; and display the process calendar.

BRIEF DESCRIPTION OF THE DRAWINGS

The present invention is described in the detailed description which follows, in reference to the noted plurality of drawings by way of non-limiting examples of exemplary embodiments of the present invention, in which.

DETAILED DESCRIPTION OF EMBODIMENTS OF THE INVENTION

The invention generally relates to managing process calendars and, more particularly, to creating, displaying, modifying, and utilizing process calendars. In implementations of the invention, a comparison of a client process calendar to a provider process calendar is created and displayed. In further implementations of the invention, a process calendar that accounts for tasks performed by both a client and provider is created, displayed, and modified. In even further implementations of the invention, a multi-process calendar is created and displayed. In this manner, the various process calendars may be utilized in decision making processes, such as, for example, negotiations between client and provider, staffing decisions, resource allocation, constraint management, and buffer handling.

Figure 1:
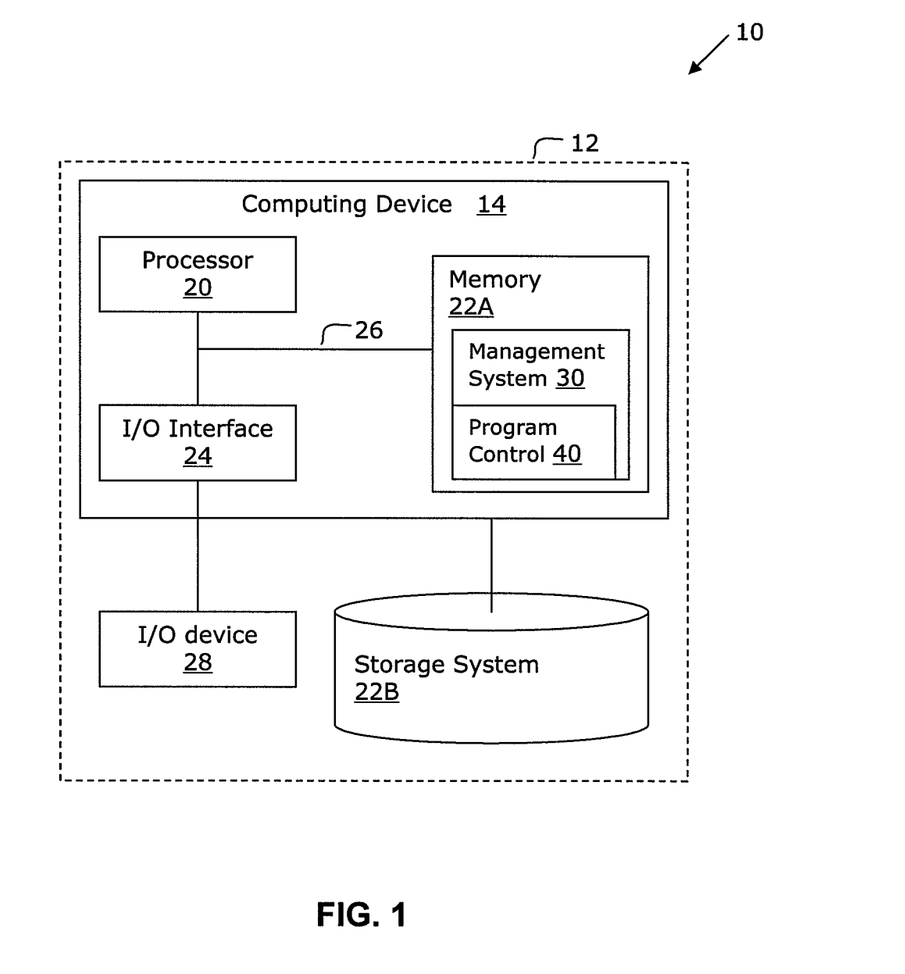
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, for example, managing business process calendars. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The I/O device/resource 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc.

The processor 20 executes computer program code (e.g., program control 40), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or Providing Entity, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

Process Calendar Comparison

Figure 2:
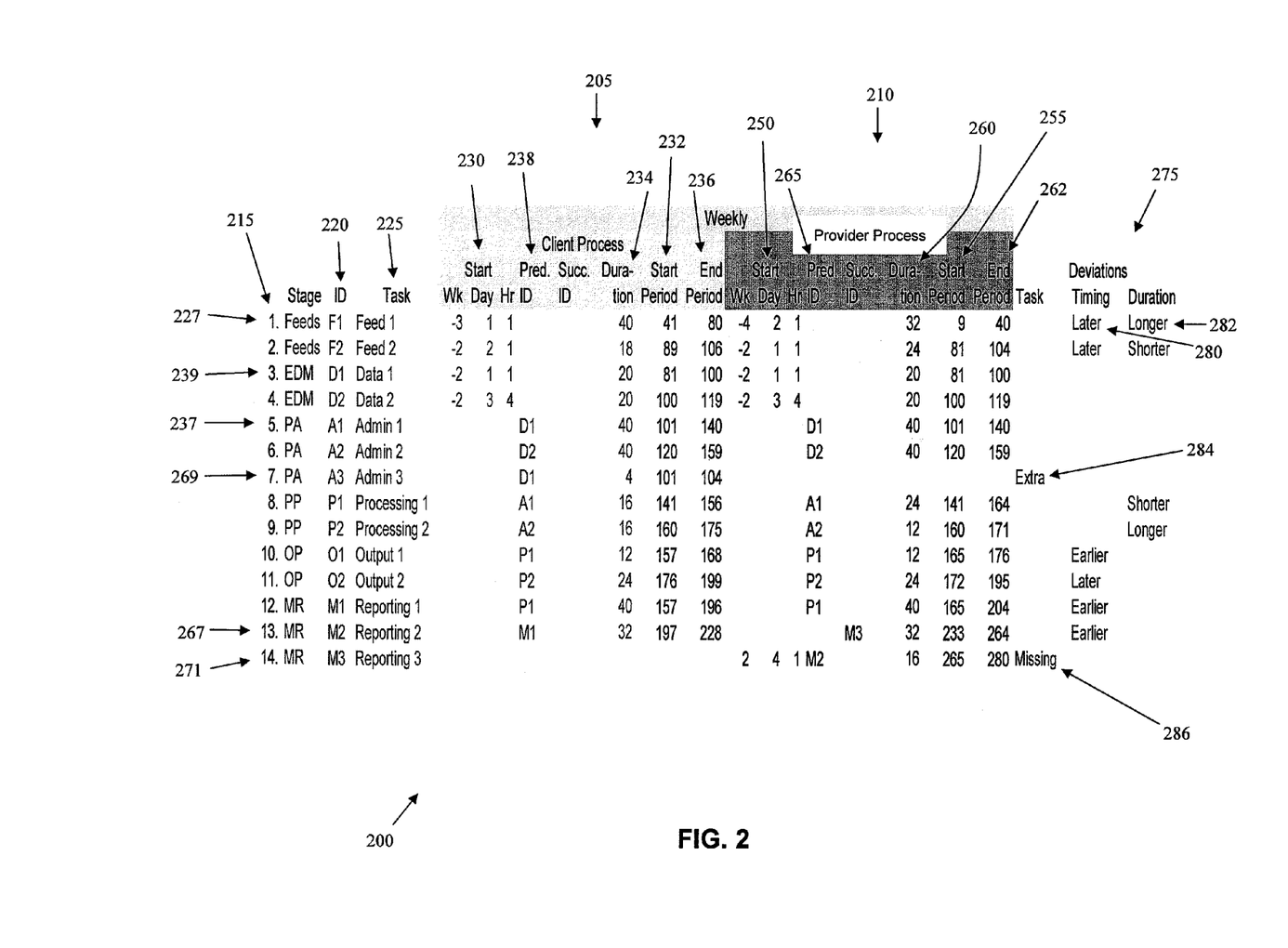
FIGS. 2-4 show comparisons of process calendars according to aspects of the invention.

FIG. 2 shows a comparison 200 of a client process calendar and a provider process calendar according to aspects of the invention. Such a comparison is useful for identifying and reconciling deviations between the client process and the provider process. Although FIG. 2 is described with respect to a specific example, the invention is not limited to this example; rather, implementations of the invention may be used with process calendars associated with any type of process, having any number and types of tasks, having any desired precedence, duration, etc.

In the exemplary comparison 200 depicted in FIG. 2, a client's process calendar 205 for handling a process (e.g., payroll) is shown beside a provider's process calendar 210 for handling the same process. The process calendars 205 and 210 include fourteen tasks 215 numbered one through fourteen. Each task 215 is also associated with a task ID 220 (e.g., F1, F2, D1, etc.) and a task name 225 (e.g., Feed 1, Feed 2, Data 1, etc.). For instance, the first task has an ID of "F1" and is named "Feed 1", and may comprise, for example, generating data regarding hours worked by each employee.

The process calendars depicted in FIG. 2 are shown with a weekly cycle, where each week of the cycle comprises forty hourly periods and payday occurs at week zero. However, the invention is not limited to these parameters, and any other suitable parameters may be used. For example, other cycles, such as monthly, biweekly, semi-monthly, or any other suitable cycle, may be used. Moreover, the cycle may be divided into any suitable types and numbers of units, such as a fifty hour work week.

The client's first task F1, indicated by first row 227, is back-scheduled to meet the due date of payday at week 0, meaning that task F1 is to be performed before week 0. In the example shown, task F1 begins at the first hour of the first day of week −3, as indicated by values at the intersection of first row 227 and start columns 230. This translates to a start period of 41, as indicated by start period column 232, because, in this example, week −4 comprises periods 1-40, week −3 comprises periods 41-80, week −2 comprises periods 81-120, etc. As is further shown in FIG. 2, client task F1 has a duration of 40 hours, as indicated by duration column 234, meaning the task has an end period of 80, as shown in end period column 236. Client tasks F2, D1, and D3 are shown in a similar fashion in the client process calendar 205.

In this example, the client's task A1, shown in fifth row 237, may be associated with payroll administration, and may comprise, for example, changing the pay rate or benefits of an employee. Client task A1 is shown as having a predecessor task D1, indicated by a value at the intersection of fifth row 237 and predecessor ID column 238. This means that task A1 is related to task D1 such that task A1 cannot start until task D1 is complete. Since task D1 has an end period of 100, as indicated by the intersection of third row 239 and end period column 236, task A1 is scheduled to have a start period of 101 (seen at the intersection of fifth row 237 and start period column 232). Client tasks A2, A3, P1, P2, O1, O2, M1, M2, and M3 are shown in a similar fashion in the client process calendar. In this manner, the client process calendar 205 shows various tasks comprised in a process (e.g., payroll), including the start period, duration, and end period of each task.

FIG. 2 also shows a provider's process calendar 210 for the same process (e.g., payroll). A provider may perform a process differently from a client for any number of reasons, such as, for example, different technology, different skills, historical best practice, etc. For example, in the implementation shown, the provider performs task F1 at the first hour of the second day of week −4, as indicated by the intersection of first row 227 and provider start columns 250. This translates to the provider beginning task F1 at period 9, as shown in provider start period column 255.

Furthermore, the provider only requires a duration of 32 hours to perform task F1, as indicated by provider duration column 260, meaning that the provider ends task F1 at period 40, shown in provider end period column 262. Provider tasks F2, D1, and D2 are depicted in similar fashion. As can be seen, for each respective task (e.g., F1, F2, D1, etc.) the client and provider may have different duration, start period, and end period.

Still referring to FIG. 2, the provider process calendar 210 shows provider task A1 having a predecessor task D1, as indicated at the intersection of fifth row 237 and provider predecessor ID column 265. However, the provider tasks do not necessarily have the same predecessor tasks as the corresponding client task. For example, as shown in thirteenth row 267, provider task M2 does not have a predecessor task, while client task M2 must be preceded by client task M1. Similarly, it is possible that the client and provider do not even perform all of the same tasks. For example, as depicted by seventh row 269, the provider does not have a task that corresponds to client task A3. Similarly, and the client does not have a task that corresponds to provider task M3, as indicated by fourteenth row 271.

Thus, by creating and displaying the client process calendar 205 and the provider process calendar 210 side-by-side, one can identify deviations between the client process and the provider process. Moreover, in embodiments, these deviations may be displayed in an area alongside the compared process calendars. For example, the deviation display area 275 shows that client task F1 begins later (reference number 280) and has a longer duration (reference number 282) than corresponding provider task F1. Similarly, the deviation display area 275 shows that client task A3 is extra (e.g., performed by the client but not by the provider, as indicated by reference number 284), and that client task M3 is missing (e.g., performed by the provider but not by the client, as indicated by reference number 286).

The comparison 200 is useful for many purposes. For instance, such a comparison may be useful in fulfilling a due diligence requirement before engaging a service provider for outsourcing of a process. Furthermore, once deviations are identified, such deviations can be reconciled. For example the client and provider may determine whether the deviations are due to different assumptions about volume or service levels, or some other reason(s). In such situations, they may determine whether the client is satisfied with the provider's standard process or if that process will be modified for this client. This has the possibility of affecting the service agreement between the client and provider both in terms of cost and level of quality to be provided.

Figure 3:
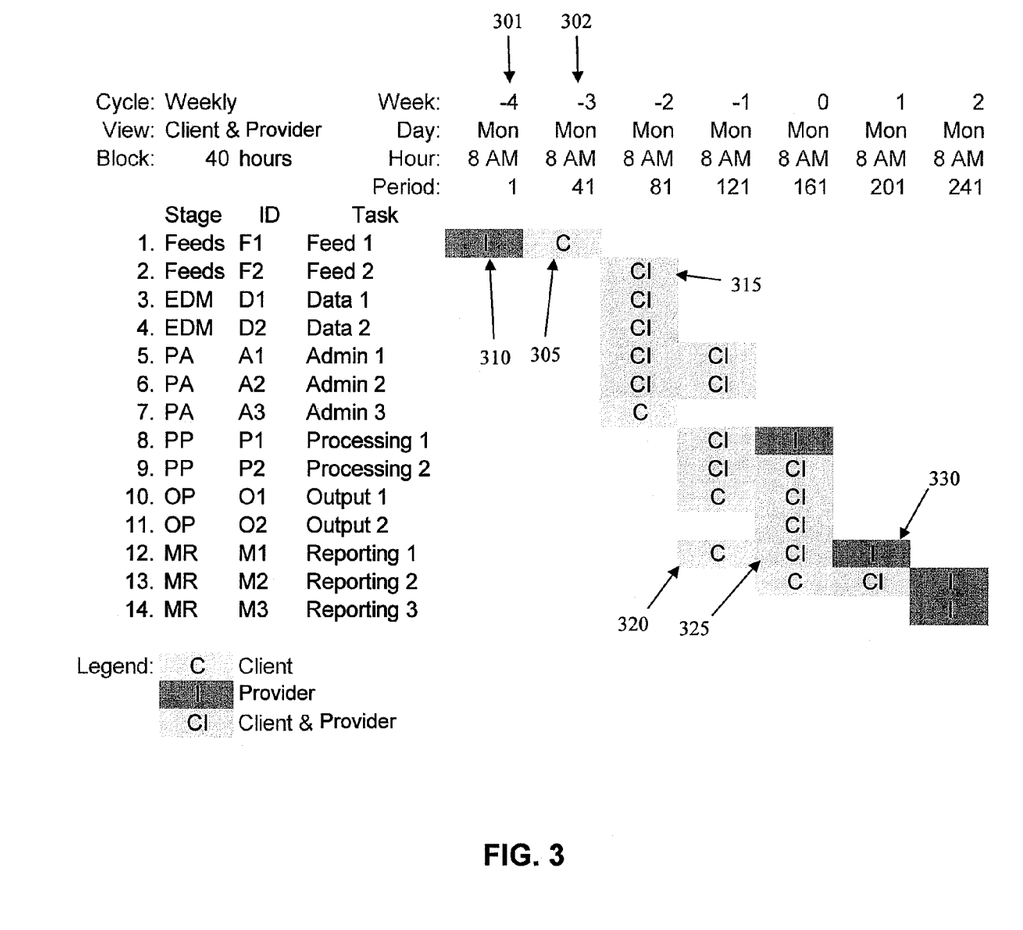

Embodiments of the invention provide for displaying a comparison of the client process calendar and the provider process calendar in different forms. For example, FIG. 3 shows the process calendar data of FIG. 2 in a week-by-week view. That is, in FIG. 3, the same fourteen tasks from FIG. 2 (e.g., F1, F2, D1, D2, A1, A2, A3, P1, P2, O1, O2, M1, M2, M3) are depicted as rows, while the weeks (e.g., −4, −3, −2, −1, 0, 1, and 2) are displayed as columns. For example, column 301 corresponding to Week −4 comprises periods 1-40, column 302 corresponding to Week −3 comprises periods 41-80, etc.

In FIG. 3, a box with the letter "C" at the intersection of a certain task (depicted by a horizontal row) and a specific week (depicted by a vertical column) indicates that the client process calendar calls for the client to perform that task during at least a portion of that week. For example, as described earlier with respect to FIG. 2, the client performs task F1 during week −3. Therefore, there is a box with the letter "C" at the intersection of F1 and week −3, as indicated by reference number 305.

A box with the letter "I" at the intersection of a certain task and a specific week indicates that the provider process calendar calls for the provider to perform that task during at least a portion of that week. For example, as described earlier with respect to FIG. 2, the provider performs task F1 during week −4. Therefore, there is a box with the letter "I" at the intersection of F1 and week −4, as indicated by reference number 310.

A box with the identifier "CI" indicates that the client and the provider both perform a task during at least a portion of that week. For example, both the client and the provider perform task F2 during week −2, as indicated by reference number 315.

As further depicted in FIG. 3, some tasks span more than one week. For example, the client performs task M2 during week 0 and week 1, shown by reference numbers 320 and 325, while the provider performs task M2 during week 1 and week 2, shown by reference numbers 325 and 330.

Figure 4:
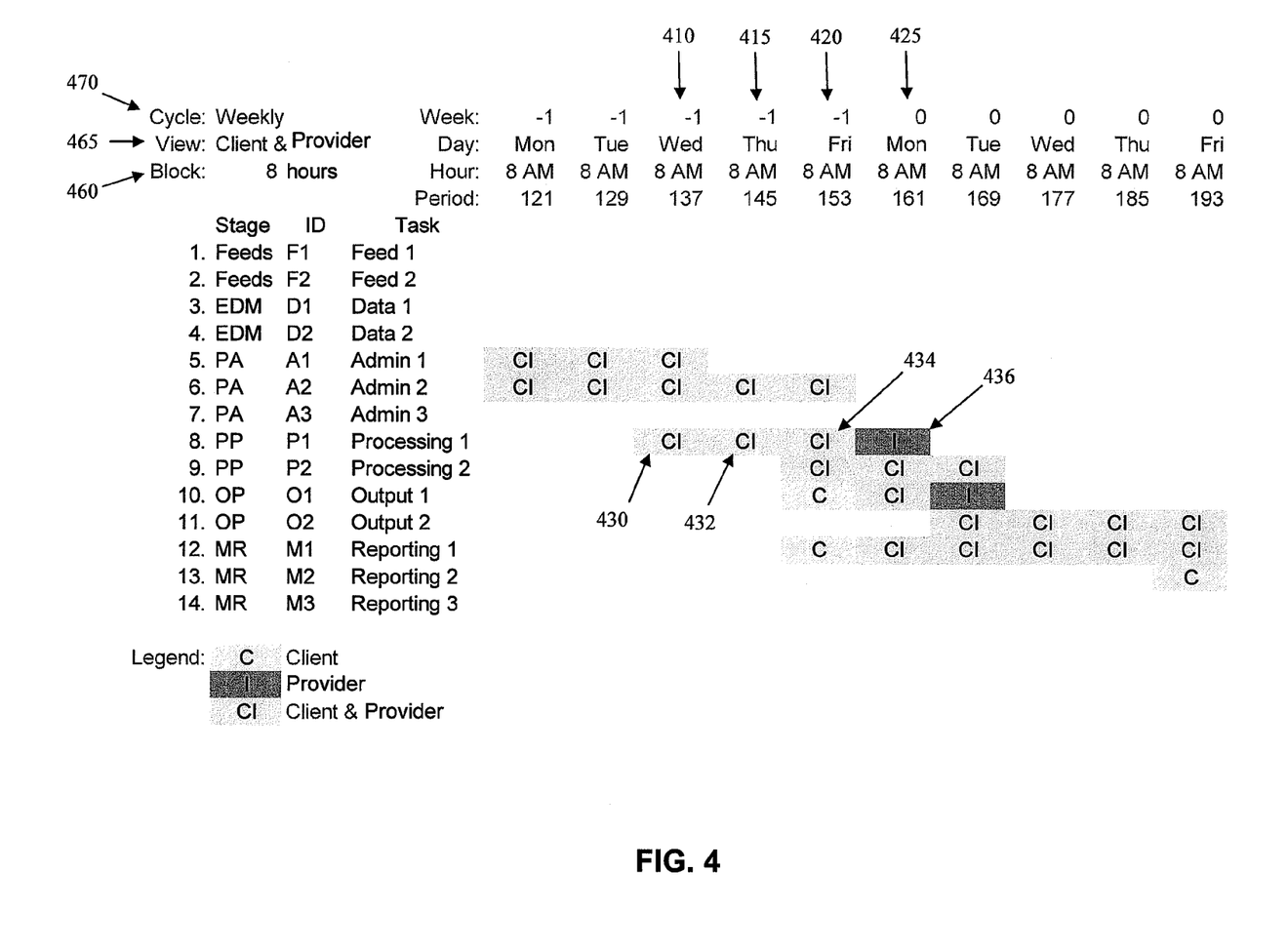

FIG. 4 shows data from the same process calendar comparison as FIGS. 2 and 3, but at an even finer resolution. That is, FIG. 4 shows tasks that occur during eight hour time blocks, with each vertical column representing a single working day. For example, column 410 corresponding to Wednesday of week −1 includes periods 137-144, column 415 corresponding to Thursday of week −1 includes periods 145-152, column 420 corresponding to Friday of week −1 includes periods 153-160, and column 425 corresponding to Monday of week 0 includes periods 161-168, etc.

In this example (as shown in the data in FIG. 2), the client performs task P1 beginning at period 141 and ending at period 156. This is depicted in FIG. 4 by boxes 430, 432, and 434 (each containing at least the letter "C") at the intersection of P1 and the appropriate vertical columns that include these time periods. Similarly, the provider performs task P1 beginning at period 141 and ending at period 164. This is depicted in FIG. 4 by boxes 430, 432, 434, and 436 (each containing at least the letter "I") located at the intersection of P1 and the appropriate time periods.

While resolutions of forty hours (FIG. 3) and eight hours (FIG. 4) have been described, it is noted that the invention is not limited to these exemplary values. Instead, any suitable resolution may be used. For example, implementations of the invention may take a software form that presents the aforementioned comparisons as part of a graphical user interface (GUI), where a user may view the comparison at any suitable resolution by designating the resolution through the a block selection portion 460 of the GUI such as, for example, a drop down menu or text field. Additionally or alternatively, the GUI may include a view selection portion 465 through which a user may select to view only the client process calendar, only the provider process calendar, or both the client and provider process calendar. Even further, the GUI may include a cycle selection portion 470 that allows a user to choose to display the process calendar data according to any suitable cycle, such as, for example, weekly, biweekly, monthly, semi-monthly, etc.

Thus, implementations of the invention provide for creating and displaying a comparison of the client process calendar and the provider process calendar at differing resolutions. This may be used to further identify deviations between the client process calendar and the provider process calendar, which deviations can then be reconciled in any suitable fashion.

Process Calendar Accommodating Time Zones

It is sometimes the case that a client and a provider cooperate to perform a process while the client and provider are located in different time zones. One way to reconcile time zone differences is for the provider resources (e.g., employees, computing devices, etc.) to work an overnight shift that coincides with normal working hours at the client site. This eliminates the time-zone difference between the client and the provider, and may be performed in front-office business processes where the service provider must interact in real time with the client's employees or customers. However, it is not always feasible, or even beneficial, to perform concurrent client and provider shifts.

For example, in processes where work products flow from task to task without interaction, it can be beneficial to have client staff and provider staff offset by time zones, such that the client may be working on its task while the provider is not working, and vice versa. In this manner, the effective daily productive hours can grow from 8 to 16 or even 24 at times.

Figure 5A:
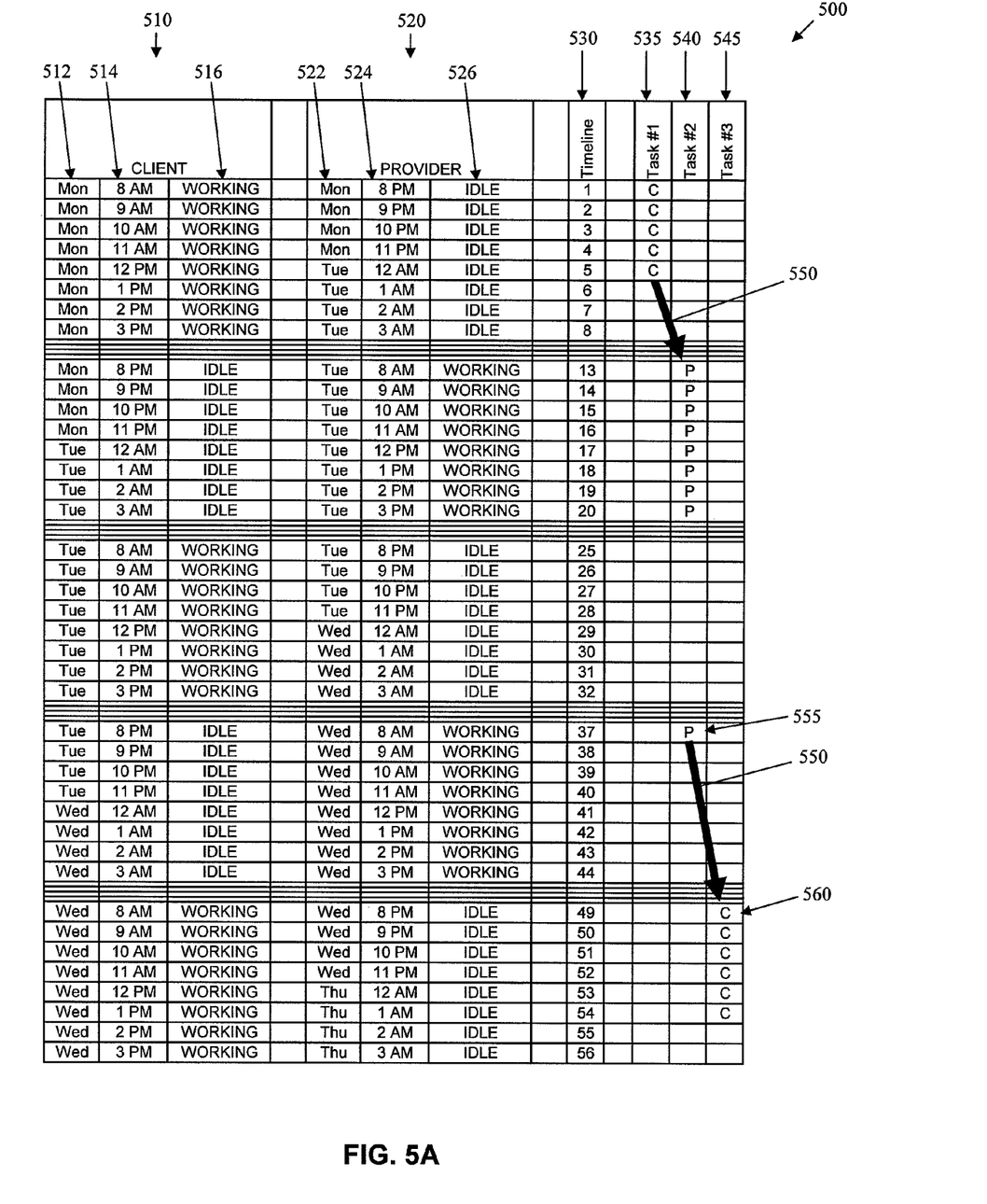
FIGS. 5A-5C show process calendars according to aspects of the invention.

FIG. 5A shows a process calendar 500 according to implementations of the invention that accounts for time zone differences between a client and a provider. In the example shown, the client and provider are located in time zones twelve hours apart. Such situations might arise, for example, when the provider performs its part of a business process in a shared service center elsewhere in the world because that center has the skill or cost profile necessary to meet the client requirements.

In the process calendar 500, the client and provider cooperate to perform a business process. That is, both the client and provider have tasks to do in order to complete the process. A client schedule 510 is shown, which includes a client day 512, client time 514, and client status 516. A provider schedule 520 is also shown, which includes a provider day 522, provider time 524, and provider status 526. As can be seen, the client and the provider are situated in time zones that are twelve hours apart, such that 10:00 AM Monday client time corresponds to 10:00 PM provider time. A time period column 530 is provided for ease of comparison of the offset time zones.

In the exemplary process calendar, the tasks are constrained to be performed in sequential order. That is, task #1 must be completed before task #2 is begun, and task #2 must be completed before task #3 is begun. Arrows 550 between tasks indicate gaps where no work is accomplished until working hours resume at the other site. The process may be, for example, a payroll process, although other processes may be used with the invention. Moreover, the durations and constraints (e.g., precedents) described are merely exemplary, and any suitable process with any desirable tasks may be used with the invention.

In the exemplary process calendar 500, the difference in time zones is wide enough that none of the normal working hours overlap across sites. (Non-working hours at both sites are suppressed from the illustration for clarity.) As depicted in FIG. 5A, task #1 has a duration of five working hours, and is performed by the client as depicted by the letter "C" at various time slots in column 535. Task #2 has a duration of nine working hours and is performed by the provider as indicated by the letter "P" at time slots in column 540. Task #3 has a duration of six working hours and is performed by the client as indicated by the letter "C" at time slots in column 545.

The process calendar 500 is useful for optimizing efficiency in the process. For example, when a particular task has a duration of more than one working day (e.g., eight hours), that task may cause considerable delay in the process. More specifically, it can be seen from FIG. 5A that task #2 has a nine hour duration. If the provider works on task #2 for only eight hours in a day (e.g., from time period 13 through time period 20), then the last hour of task #2 will not be completed until time period 37 (e.g., the provider's next working day), indicated by reference number 555. Therefore, the client cannot begin task #3 until time period 49 (8:00 AM Wednesday, client time), indicated by reference number 560.

Figure 5B:
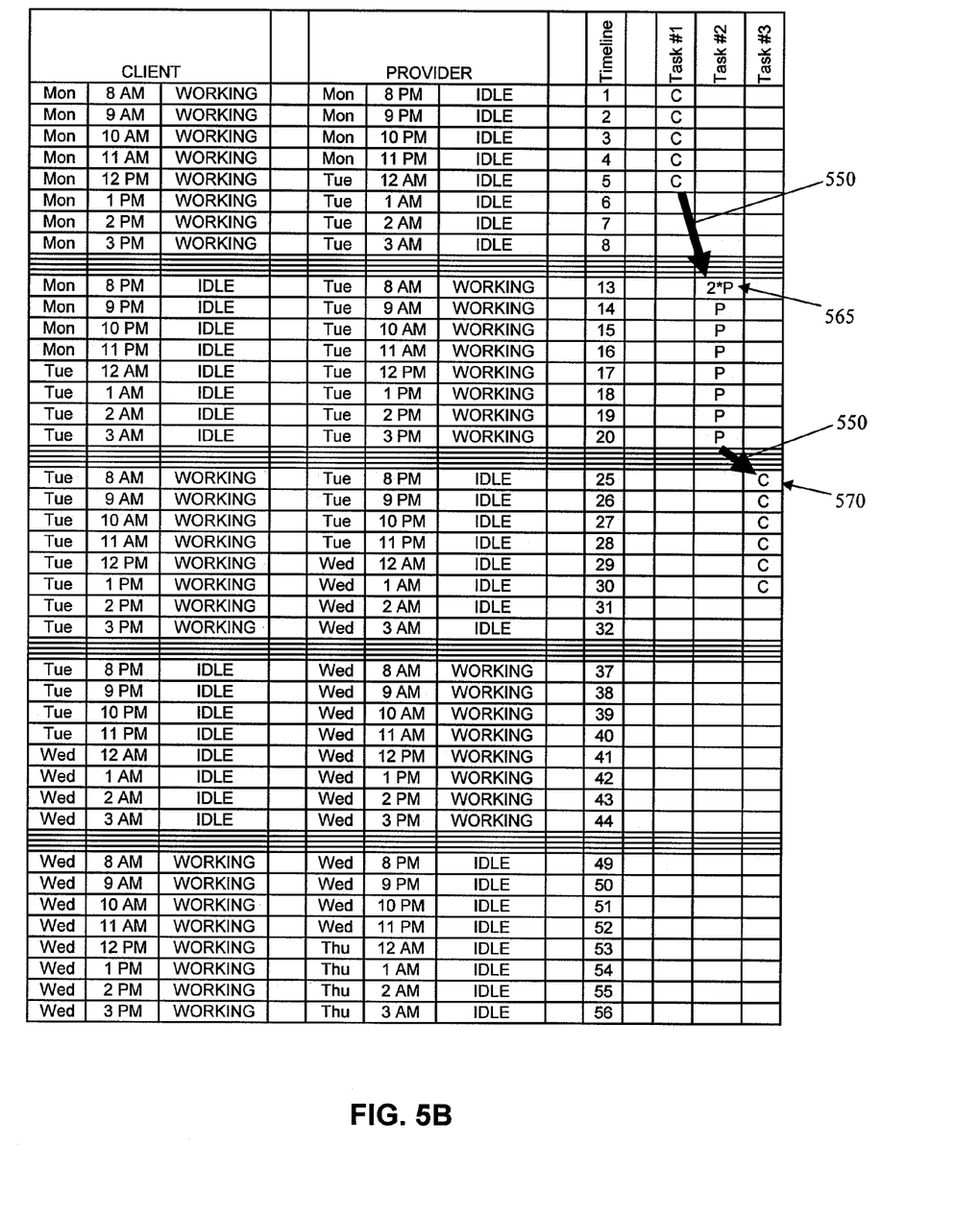

By creating and depicting the process calendar 500 in accordance with aspects of the invention, a user (e.g., manager, automated computer program, etc.) may recognize the inefficiency shown in FIG. 5A, and take action to address the inefficiency. For example, the user may modify the process calendar, as shown in FIG. 5B, to schedule an extra resource (e.g., employee, work station, etc.) devoted to task #2 during time period 13, as indicated by reference number 565. This allows the provider to complete task #2 by time period 20, which allows the client to begin task #3 at time period 25 (8:00 AM Tuesday, client time, indicated by reference number 570), a full day earlier than the scenario depicted in FIG. 5A. Thus, by using implementations of the invention to create and display a process calendar, the efficiency of a process can be enhanced. For example, process calendars according to aspects of the invention may be utilized to make a business decision, such as, for example: re-defining a start period of a particular task; re-defining an end period of a particular task; allocating extra resources to a particular task; re-assigning a particular task, or a portion thereof, from the client to the service provider, or vice versa; re-assigning a particular task to a third entity (e.g., a subcontractor); eliminating or creating a particular task; changing an automation portion of a particular task (e.g., substituting technology for labor); and scheduling overtime or time-off associated with a particular task to coincide with peaks and valleys in the schedule.

Figure 5C:
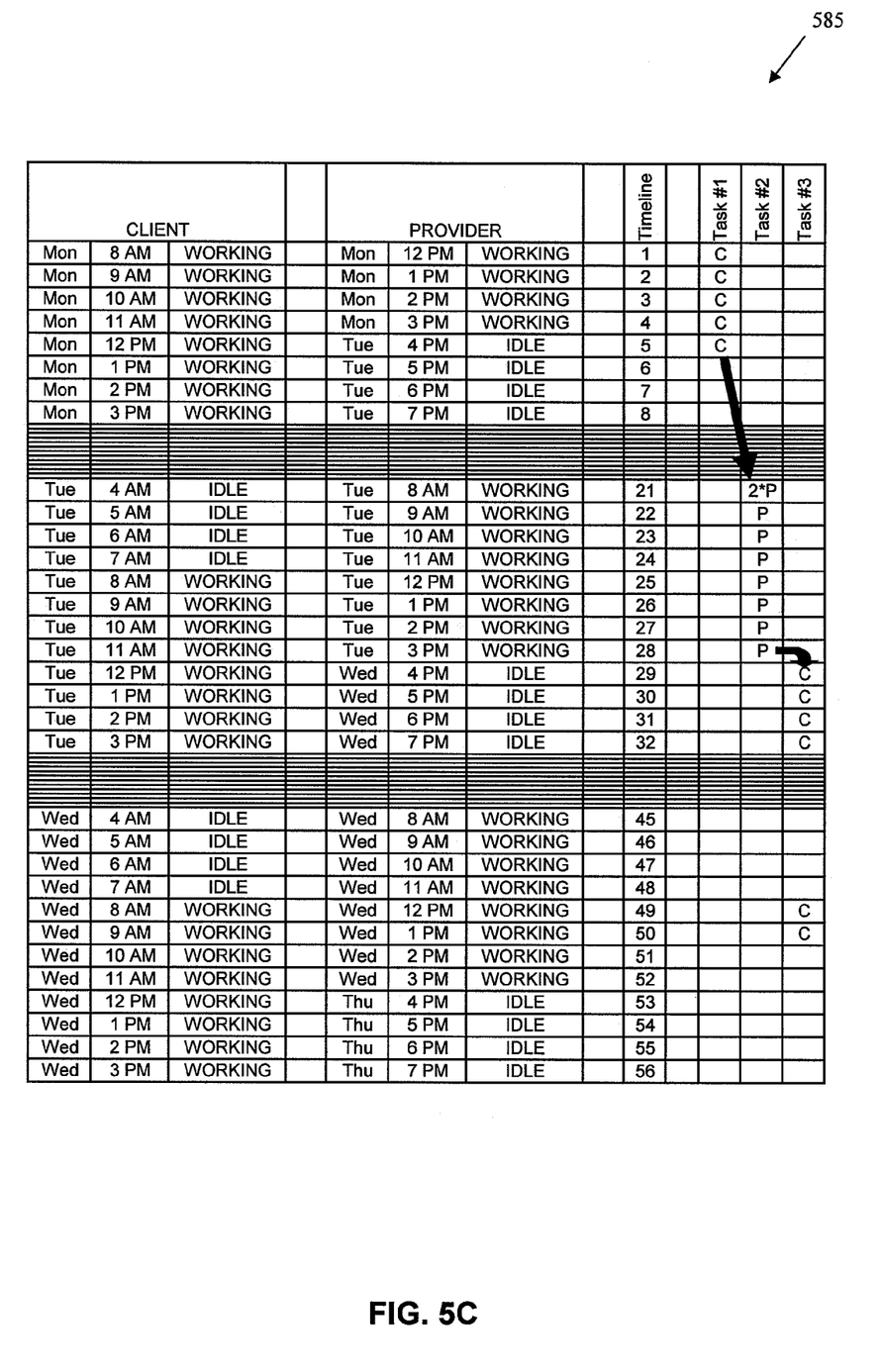

Implementations of the invention can also be useful in depicting how a first time zone offset may affect a business process differently from a second time zone offset. For example, a process calendar 585 is shown in FIG. 5C in which the client work-day and the provider work-day are offset by four hours instead of twelve hours (as in FIG. 5B). By mapping out the same process described in FIG. 5B, it is shown that the four hour offset in process calendar 585 causes task #3 to be completed by 9:00 AM Wednesday (client time) as compared to 1:00 PM Tuesday (client time) for the process calendar shown in FIG. 5B. Thus, by comparing FIGS. 5B and 5C, the process calendar can be used to determine how a first time zone offset may affect a process differently from a second time zone offset. This information can be used, for example, to adjust resources to optimize the efficiency of the process.

As can be seen from FIGS. 5A-5C, implementations of the invention provide information for creating and displaying process calendars, and for making management decisions about processes based upon the information gleaned from the process calendars. For example, the creation and depiction of a process calendar can be used to identify where and how constraints create inefficiency. Similarly, implementations of the invention may be used to simulate the addition of buffers into the schedule (e.g., scheduling more time than normally required for a task), to see how that will affect the rest of the process.

Multi-Process Calendar

Figure 6:
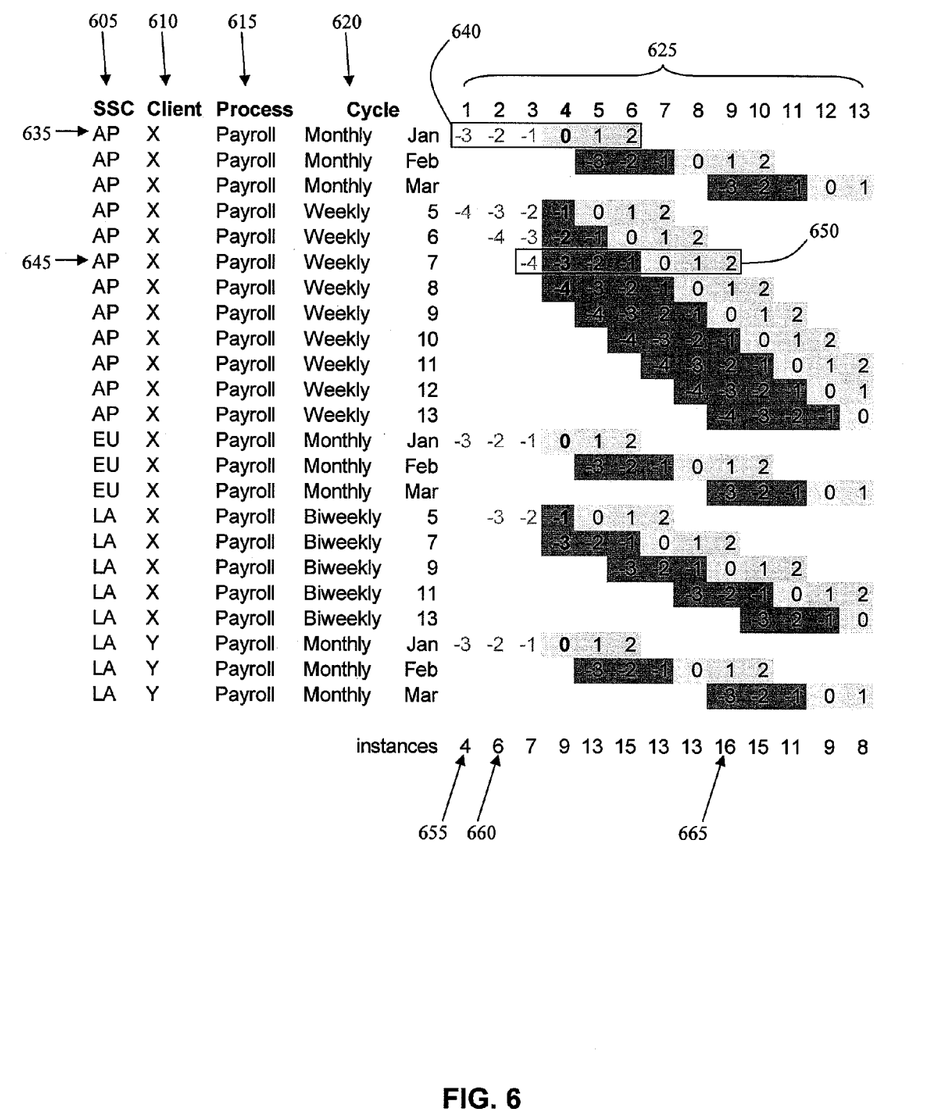
FIG. 6 shows a multi-process calendar according to aspects of the invention.

FIG. 6 shows a process calendar 600, according to aspects of the invention, which includes data relating to multiple processes. The exemplary process calendar 600 is for a service provider that performs, for example, payroll for clients X and Y. As indicated by service center column 605 and client column 610, the service provider pays some client X employees from service center AP (Asia-Pacific), other client X employees from service center EU (Europe), and other client X employees from service center LA (Latin America). Additionally, the service provider pays client Y employees from service center LA. Moreover, as indicated by cycle column 620, the service provider pays the various employees on either a monthly, weekly, or biweekly cycle.

In the exemplary embodiment shown, each numbered column 625 represents one week in the calendar. Moreover, each row represents a separate process. An entry at the intersection of a row and column indicates a task that is performed for that process during that week. For example, the first row 635 represents client X's monthly payroll from service center AP for the month of January. In this process, tasks are performed in weeks 1 through 6, as indicated by reference number 640. Similarly, the sixth row 645 represents client X's weekly payroll from service center AP for week 7. In this process, tasks are performed in weeks 3 through 9, as indicated by reference number 650.

By creating and displaying a multi-process calendar according to aspects of the invention, it is possible to track, amongst other things, the number of tasks performed per week. For example, when considering all of the processes together, there are four tasks performed in week one, as indicated by reference number 655. Likewise, there are six tasks performed in week two, as indicated by reference number 660. In this manner, peak work weeks (such as those indicated by reference number 665) can be identified for adequate resource management. Although number of instances of tasks per week are shown in FIG. 6, the invention is not limited to this example; rather, any suitable information may be tallied and displayed, such as, for example, the number of hours to be worked, the number of people assigned, etc.

Methods of the Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 7:
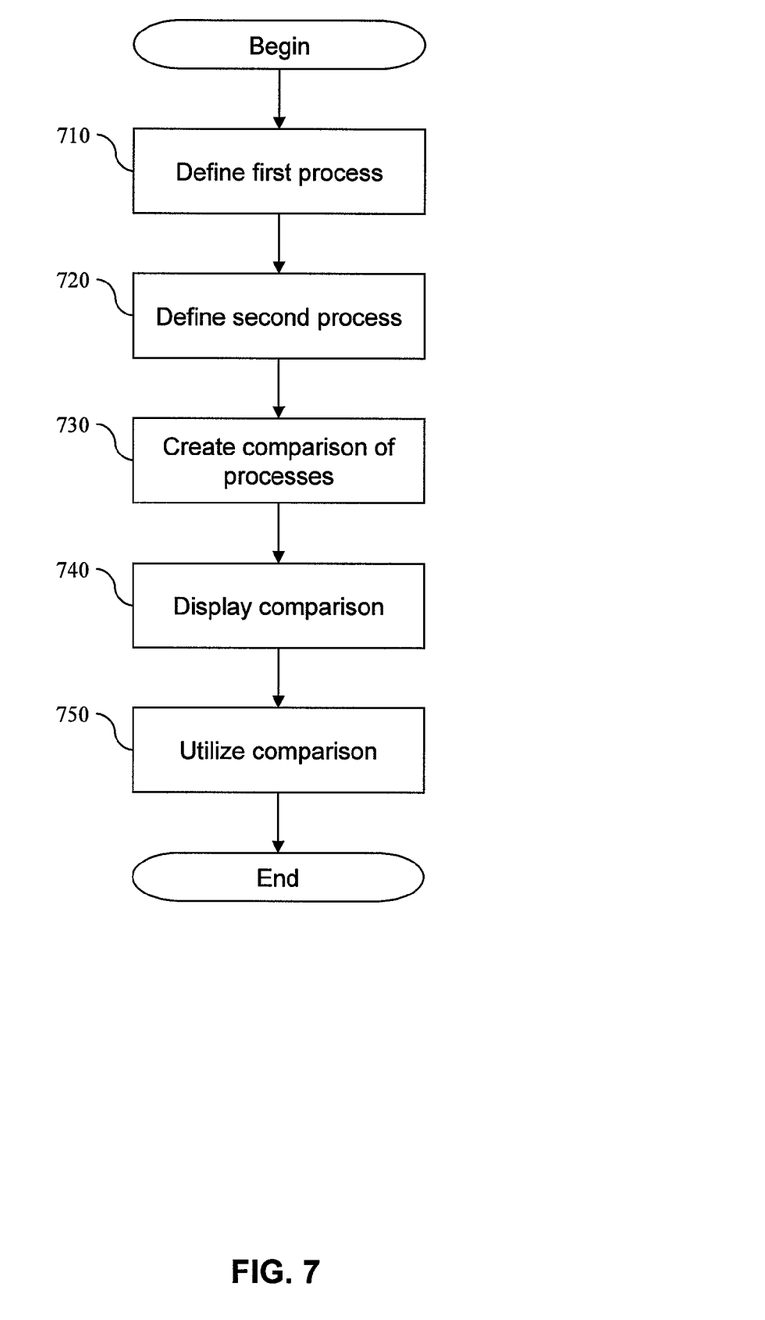
FIGS. 7-9 show flow diagrams depicting implementations of methods according to aspects of the invention.

FIG. 7 shows a flow diagram depicting steps of a first method for comparing processes according to aspects of the invention. At step 710, a first process is defined. This may be accomplished using the program control described above with respect to FIG. 1. In embodiments, this comprises defining a client process, such as, for example, a client process like that shown in FIG. 2. The step of defining may comprise, for example, obtaining data regarding each task in the client process, as well as the duration, start period, end period, and precedence of each task. The data defining the first process may be stored in (or stored by using) a computing device, such as, for example, that described with respect to FIG. 1.

At step 720, a second process is defined. This may be accomplished using the program control described above with respect to FIG. 1. In embodiments, this comprises defining a provider process, such as, for example, a provider process like that shown in FIG. 2. The step of defining may comprise, for example, obtaining data regarding each task in the provider process, as well as the duration, start period, end period, and precedence of each task. The data defining the second process may be stored in (or stored by using) a computing device, such as, for example, that described with respect to FIG. 1.

At step 730, a comparison of the first process and the second process is created. This may be accomplished using the program control described above with respect to FIG. 1. In embodiments, this comprises formatting the data associated with the first and second processes such that common tasks are associated, and so that any deviations between such common tasks are identified. The data formatting may be performed, for example, using any suitable combination of hardware and/or software that formats the first process data and the second process data into a viewable form, such as, for example, the form shown in FIGS. 2-4.

At step 740, the comparison is displayed. In embodiments, the comparison is displayed on a computing device, such as that shown in FIG. 1. Similarly, the comparison may be printed, projected, and/or displayed in any other suitable fashion.

The step of displaying may comprise utilizing a graphical user interface (GUI) such that a user of a computing device may modify the view of the display. For example, the comparison may be displayed using a software program that allows a user to change the display, such as, for example, as described with respect to FIGS. 2-4.

Optionally, at step 750, the comparison is utilized by the client and/or the service provider. In embodiments, this comprises using information gleaned from the comparison to make a decision, such as, for example, a business decision. For example, a client may utilize the comparison as part of a due-diligence effort for researching a provider for outsourcing the process. Alternatively, the client and/or the provider may utilize the comparison as a tool during negations for outsourcing of the process. However, the invention is not limited to these uses; rather, the information gleaned from the comparison may be used in any fashion to make any desired decision.

Figure 8:
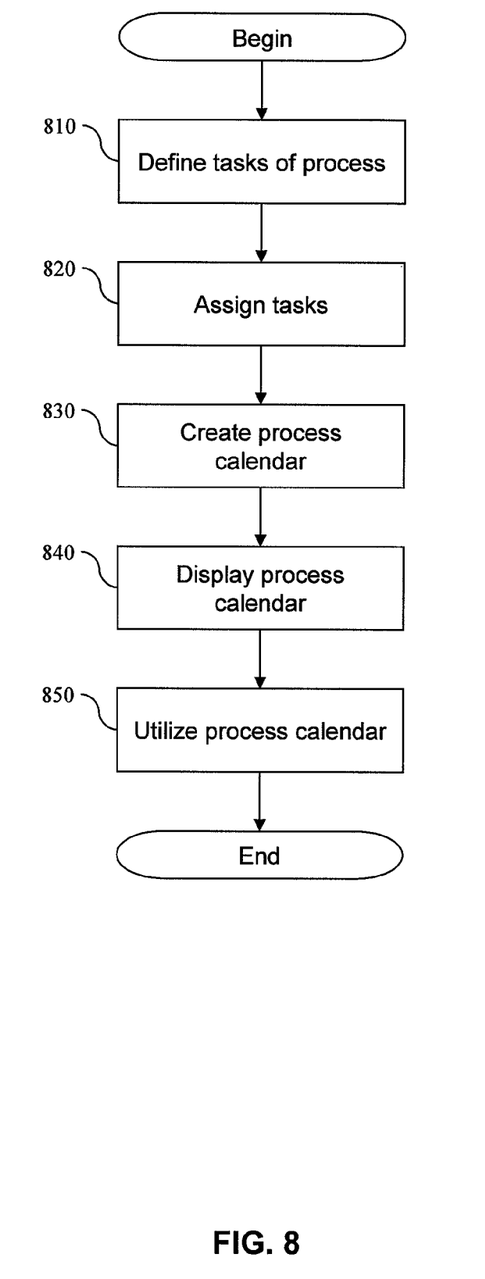

FIG. 8 shows a flow diagram depicting steps of a method for creating a process calendar according to aspects of the invention. The method can be used, for example, to create a process calendars as shown in FIGS. 5A-5C. At step 810, tasks of the process are defined. This may be accomplished using the program control described above with respect to FIG. 1. In embodiments, this comprises defining the tasks that make up the process, as well as the duration, start period, end period, and precedence of each task. The data defining the tasks may be stored in (or stored by using) a computing device, such as, for example, that described with respect to FIG. 1.

At step 820, each task is assigned to an actor. This may be accomplished using the program control described above with respect to FIG. 1. In embodiments, this comprises assigning a first subset of the tasks to a first entity (e.g., a client), and assigning a second subset of the tasks to a second entity (e.g., a provider). The assigning of tasks may be performed as a result of negotiation between the first and second entities as to who is responsible for performing each task of the process; however, the invention is not limited to such a method of assigning, and any method for assigning the tasks may be used. Moreover, the invention is not limited to two entities. That is, the tasks of the process may be divided and assigned amongst any suitable number of entities, such as additional subcontractors and third parties.

At step 830, a process calendar is created. This may be accomplished using the program control described above with respect to FIG. 1. In embodiments, this comprises arranging the tasks included in the process according to at least one of: start time, end time, duration, and precedence. For example, this may be accomplished by formatting the data associated with the tasks such that the tasks are arranged in a specific order. The data formatting may be performed, for example, using any suitable combination of hardware and/or software that formats the first process data and the second process data into a viewable form, such as, for example, the form shown in FIGS. 5A-5C.

At step 840, the process calendar is displayed. This may be accomplished using the program control described above with respect to FIG. 1. In embodiments, the process calendar is displayed on an I/O device, such as that described with respect to FIG. 1. Similarly, the process calendar may be printed, projected, and/or displayed in any other suitable fashion. The step of displaying may comprise utilizing a graphical user interface (GUI) such that a user of a computing device may modify the view of the display. For example, the process calendar may be displayed using a software program that allows a user to change the display, such as, for example, as described with respect to FIGS. 5A and 5B.

Optionally, at step 850, the process calendar is utilized by the client and/or the service provider. In embodiments, this comprises using information gleaned from the process calendar to make a decision, such as, for example, a business decision. For example, a manager may utilize the process calendar to identify and resolve conflicting tasks in a process. Similarly, a user may utilize the process calendar in combination with historical trends to add time for tasks (e.g., include buffers) where higher than normal learning or higher than normal volume is expected. However, the invention is not limited to these uses; rather, the information gleaned from the process calendar may be used in any fashion to make any desired decision.

Figure 9:
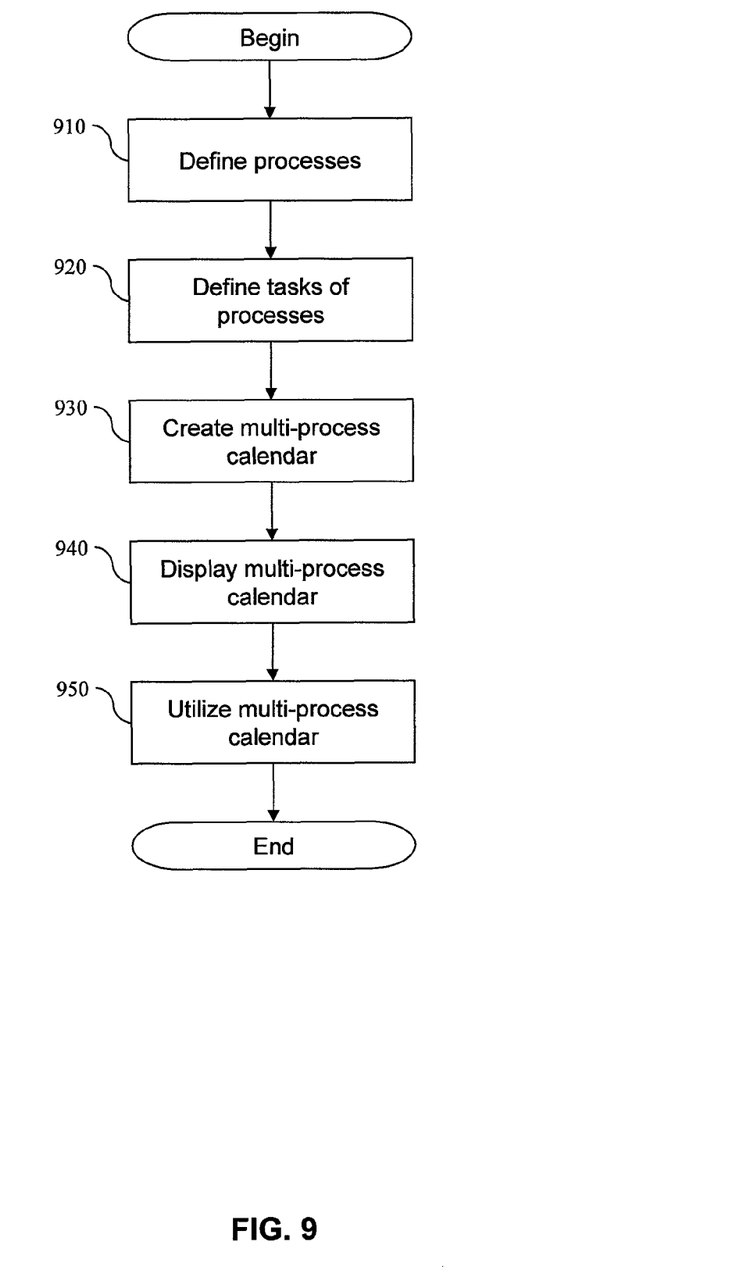

FIG. 9 shows a flow diagram depicting steps of a method for creating a multi-process calendar according to aspects of the invention. The method can be used, for example, to create a multi-process calendar as shown in FIG. 6. At step 910, each process is defined. In embodiments, this comprises defining parameters of each task, such as, for example, a service center where a task is performed, a client the task is performed for, a description of the process, a cycle that the process runs on, etc. However, the invention is not limited to processes having these parameters, and any types of processes may be defined. Data defining the processes may be stored in (or stored by using) a computing device, such as, for example, that described with respect to FIG. 1.

At step 920, tasks of the multiple processes are defined. In embodiments, this comprises defining the tasks that make up each process, as well as the duration, start period, end period, and precedence of each task. The data defining the tasks may be stored in (or stored by using) a computing device, such as, for example, that described with respect to FIG. 1.

At step 930, a multi-process calendar is created. This may be accomplished using the program control described above with respect to FIG. 1. In embodiments, this comprises arranging the tasks included in the processes according to the parameters of each process and the tasks associated with each process. For example, this may be accomplished by formatting the data associated with the processes such that the processes are arranged in a specific order. The data formatting may be performed, for example, using any suitable combination of hardware and/or software that formats the process parameters and tasks into a viewable form, such as, for example, the form shown in FIG. 6.

At step 940, the multi-process calendar is displayed. This may be accomplished using the program control described above with respect to FIG. 1. In embodiments, the multi-process calendar is displayed on an I/O device, such as that described above with respect to FIG. 1. Similarly, the multi-process calendar may be printed, projected, and/or displayed in any other suitable fashion. The step of displaying may comprise utilizing a graphical user interface (GUI) such that a user of a computing device may modify the view of the display. Additionally, the multi-process calendar may display a sum of tasks to be performed in any specified time period, such as, for example, the numbers of instances depicted in FIG. 6.

Optionally, at step 950, the multi-process calendar is utilized by the client and/or the service provider. In embodiments, this comprises using information gleaned from the multi-process calendar to make a decision, such as, for example, a business decision. For example, a manager may utilize the process calendar to identify peaks and valleys in task loads during given time periods. Consequently, the user may determine to adjust resources (staffing, computing resources, etc.) accordingly. However, the invention is not limited to these uses; rather, the information gleaned from the multi-process calendar may be used in any fashion to make any desired decision.

While the invention has been described in terms of embodiments, those skilled in the art will recognize that the invention can be practiced with modifications and in the spirit and scope of the appended claims.

What is claimed is:

1. A method of managing a payroll process, comprising:
defining a plurality of tasks of a payroll process to be performed by a client and a provider;
associating a first subset of the plurality of tasks with the provider;
associating a second subset of the plurality of tasks with the client, wherein the first subset of tasks and the second subset of tasks include a corresponding task that is performed by both the client and the provider;
creating a process calendar based upon the payroll process and the plurality of tasks, wherein the process calendar comprises a comparison between the first subset of tasks and the second subset of tasks, wherein the creating the process calendar comprises creating a client process calendar, a provider process calendar, and a deviation display area side by side in three separate areas of the process calendar;
displaying the process calendar comprising displaying the client process calendar, the provider process calendar, and the deviation display area side by side in the process calendar; and
fulfilling a due diligence requirement by comparing the client process calendar to the provider process calendar before engaging a service provider for outsourcing of a process,
wherein the displaying the client process calendar comprises showing a client start period associated with the corresponding task and a client duration associated with the corresponding task;
the displaying the provider process calendar comprises showing a provider start period associated with the corresponding task and a provider duration associated with the corresponding task;
the displaying the deviation display area comprises displaying both:
a timing deviation indicating a difference between the client start period associated with the corresponding task and the provider start period associated with the corresponding task, and
a duration deviation indicating a difference between the client duration associated with the corresponding task and the provider duration associated with the corresponding task;
the creating and the displaying are performed using a computing device;
the displaying the client process calendar comprises showing the client start period and the client duration as first and second data in a first one of the three separate areas that is associated with the client process calendar;
the displaying the provider process calendar comprises showing the provider start period and the provider duration as third and fourth data in a second one of the three separate areas that is associated with the provider process calendar;
the displaying the deviation display area comprises displaying the timing deviation as fifth data in a third one of the three separate areas that is associated with the deviation display area;
the displaying the deviation display area comprises displaying the duration deviation as sixth data in the third one of the three separate areas that is associated with the deviation display area; and
the client start period, the client duration, the provider start period, the provider duration, the timing deviation, and the duration deviation are all shown simultaneously.

2. The method of claim 1, wherein the displaying comprises providing a graphical user interface that allows a user to change at least one parameter of the displaying and wherein the at least one parameter includes at least one of: cycle, view, and block resolution.

3. The method of claim 2, wherein:
the graphical user interface includes a view selection portion that allows the user to select to view only the client process calendar, only the provider process calendar, or both the client process calendar and the provider process calendar; and
the graphical user interface includes a cycle selection portion that allows the user to choose to display the process calendar according to a weekly, biweekly, monthly, or semimonthly cycle.

4. The method of claim 1, wherein the fulfilling the due diligence requirement includes identifying deviations and reconciling the deviations, wherein the deviations are based on at least one of volume and service levels, and the method further comprises modifying the process based on client satisfaction.

5. A method for managing a process, comprising:
defining at least one process to be performed by a first entity for at least one second entity;
associating a first subset of a plurality of tasks of the at least one process with the first entity;

associating a second subset of the plurality of tasks with the at least one second entity;

creating a process calendar based upon the at least one process and the plurality of tasks;

creating a client schedule in a first area of the process calendar;

creating a provider schedule in a second area of the process calendar;

creating a third area in the process calendar that includes the first subset of tasks and the second subset of tasks, wherein the third area is a separate area of the process calendar than the first area and the second area;

adjusting resources to optimize an efficiency of the process by determining how a first time zone offset in the process calendar affects a process differently than a second time zone offset in the process calendar; and displaying the process calendar, wherein the defining, the associating the first subset, the associating the second subset, the creating, and the displaying are performed using a computer infrastructure comprising a computing device;

the first entity is a client that operates in a first time zone;

the at least one second entity is a provider that operates in a second time zone different from the first time zone;

the displaying the process calendar comprises displaying the client schedule in the first area of the process calendar, displaying the provider schedule in the second area of the process calendar, and displaying the first subset of tasks and the second subset of tasks in the third area of the process calendar;

the displaying the client schedule comprises displaying discrete units of client time in the first time zone, and displaying a respective indication of client status as one of working and idle for each respective one of the units of client time;

the displaying the provider schedule comprises displaying discrete units of provider time in the second time zone corresponding to the units of provider time, and a respective indication of provider status as one of working and idle for each respective one of the units of provider time;

the displaying the process calendar comprises displaying the first subset of tasks and the second subset of tasks relative to the discrete units of client time in the first time zone and the discrete units of provider time in the second time zone, and also according to start time, end time, duration, and precedence; and the displaying the process calendar comprises displaying arrows between tasks indicating gaps where no work is accomplished until working hours resume at another site.

6. The method of claim 5, wherein the creating the process calendar comprises creating one of:

a displayable comparison of a first method of performing the at least one process and a second method of performing the at least one process;

a displayable depiction of the first subset of tasks and the second subset of tasks relative to the first time zone and the second time zone; and a displayable multi-process calendar.

7. The method of claim 5, wherein the first subset of the plurality of tasks is mutually exclusive of the second subset of the plurality of tasks.

8. The method of claim 7, further comprising utilizing the process calendar to make a business decision based upon the displaying, wherein the business decision comprises at least one of:

re-defining a start period of a particular task;

re-defining an end period of a particular task;

allocating extra resources to a particular task;

re-assigning a particular task, or a portion thereof, from the first entity to the second entity, or vice versa;

re-assigning a particular task to a third entity;

eliminating or creating a particular task;

changing an automation portion of a particular task; and scheduling overtime or time-off associated with a particular task.

9. The method of claim 7, further comprising defining the start time, the end time, the duration, and the precedence.

10. The method of claim 9, wherein the precedence constrains the plurality of tasks to be performed in a particular order.

11. The method of claim 5, wherein:

the client status is displayed as working for normal working hours at a client site; and the creating the process calendar includes creating:

a client day column;

a client time column including data indicating the units of client time;

a client status column including data indicating the client status;

a provider day column;

a provider time column including data indicating the units of provider time;

a provider status column including data indicating the provider status; and a plurality of task columns.

12. The method of claim 5, wherein the creating the process calendar includes creating a displayable time period column that shows a timeline of units that define a relationship between the discrete units of client time in the first time zone and the discrete units of provider time in the second time zone.

13. The method of claim 5, further comprising simulating an addition of buffers into a schedule to determine how the addition of the buffers affects the process, wherein the buffers are periods of time added to the time normally required for a task.

* * * * *